(12) United States Patent
Asakawa et al.

(10) Patent No.: US 9,599,224 B2
(45) Date of Patent: Mar. 21, 2017

(54) SHELL OF PRESSURE-RESISTANT CONTAINER, PRESSURE-RESISTANT CONTAINER, AND EXPLORATORY APPARATUS

(75) Inventors: Kenichi Asakawa, Yokosuka (JP);
Tadahiro Hyakudome, Yokosuka (JP);
Masao Yoshida, Kirishima (JP)

(73) Assignees: KYOCERA CORPORATION, Kyoto-shi, Kyoto (JP); Japan Agency For Marine-Earth Science & Technology, Yokosuka-shi, Kanagawa (JP)

( * ) Notice: Subject to any disclaimer, the term of this patent is extended or adjusted under 35 U.S.C. 154(b) by 266 days.

(21) Appl. No.: 13/638,551

(22) PCT Filed: Mar. 29, 2011

(86) PCT No.: PCT/JP2011/057919
§ 371 (c)(1),
(2), (4) Date: Sep. 28, 2012

(87) PCT Pub. No.: WO2011/122648
PCT Pub. Date: Oct. 6, 2011

(65) Prior Publication Data
US 2013/0026172 A1    Jan. 31, 2013

(30) Foreign Application Priority Data
Mar. 29, 2010 (JP) ................. 2010-076434

(51) Int. Cl.
*F17C 1/00* (2006.01)
*F16J 12/00* (2006.01)
*B63C 11/48* (2006.01)

(52) U.S. Cl.
CPC .............. *F16J 12/00* (2013.01); *B63C 11/48* (2013.01)

(58) Field of Classification Search
USPC ................. 220/581, 584, 562, 560
See application file for complete search history.

(56) References Cited

U.S. PATENT DOCUMENTS 2,019,059 A    10/1935  Sherman
3,905,323 A *  9/1975  Kacere ............ 114/39.23
(Continued)

FOREIGN PATENT DOCUMENTS

CA    2719922 A1    10/2009
JP    S62-026795 U    2/1987
(Continued)

OTHER PUBLICATIONS

"Development Trend of Foreign Deep-sea Technologies", Journal of Japan Deep Sea Technology Association, 2007, No. 3.
(Continued)

*Primary Examiner* — Jeffrey Allen
(74) *Attorney, Agent, or Firm* — Procopio Cory Hargreaves and Savitch LLP

(57) ABSTRACT

There are provided a shell of a pressure-resistant container that is made of ceramics, is used for a pressure-resistant container formed with a through hole, and can be made higher in strength and lighter in weight, as well as to provide a pressure-resistant container and an exploratory apparatus. A shell of a pressure-resistant container includes a shell portion and a thick-walled portion. The shell portion is made of ceramics and has a convexly-curved surface. The thick-walled portion is made of ceramics, continues into the shell portion, is larger in thickness than the shell portion, and has a through hole penetrating through the thick-walled portion in a thickness direction thereof.

6 Claims, 13 Drawing Sheets

(56) References Cited

U.S. PATENT DOCUMENTS

| | | |
|---|---|---|
| 5,603,788 A | 2/1997 | Abe et al. |
| 2005/0087537 A1* | 4/2005 | Kimbara et al. ............. 220/586 |
| 2011/0024431 A1 | 2/2011 | Yano et al. |

FOREIGN PATENT DOCUMENTS

| | | |
|---|---|---|
| JP | S64-026065 A | 1/1989 |
| JP | H02-064928 U | 5/1990 |
| JP | H05-060242 A | 3/1993 |
| JP | H09-301273 A | 11/1997 |
| WO | 2009/119421 A1 | 10/2009 |

OTHER PUBLICATIONS

International Search Report dated May 31, 2011, issued for International Application No. PCT/JP2011/057919.
International Preliminary Report on Patentability issued for International Application No. PCT/2011/057919.
Extended European Search Report dated Apr. 13, 2015 with regard to European Patent Application No. 11762872.7.

* cited by examiner

SHELL OF PRESSURE-RESISTANT CONTAINER, PRESSURE-RESISTANT CONTAINER, AND EXPLORATORY APPARATUS

TECHNICAL FIELD

The present invention relates to a shell of a pressure-resistant container for accommodating a measurement instrument such as a magnetometer for seabed exploration in deep-sea research activities, which exhibits high pressure-resistant capability under high-pressure conditions in the deep sea, as well as to a pressure-resistant container and an exploratory apparatus employing the same.

BACKGROUND ART

In pressure-resistant containers for use in deep-sea research activities, in response to strong demands for strength enhancement and weight reduction, a titanium alloy or the like has been used as the material of construction of a pressure-resistant structure for deep-sea use purposes. Such a related art is disclosed in Patent Literature 1.

In this related art reference, there is described a titanium alloy-made pressure-resistant container composed of two head sections, each of which corresponds to a semispherical shell, and a barrel section having the shape of a right circular cylinder. In this pressure-resistant container, the barrel section has a flange formed at each end, and also each of the head sections has a flange formed at its opening edge. The sections are assembled into the container by joining the flanges together with bolts and nuts. The flanges of the barrel section, as well as the flanges of, respectively, the head sections, are each formed through the cutting operation of a forged product of a titanium alloy.

Furthermore, another related art is disclosed in Non-Patent Literature 1. In this related art reference, use of ceramics instead of a titanium alloy has been proposed, because, in the case where a pressure-resistant container is made of a titanium alloy as in the related art of the foregoing Patent Literature 1, the specific gravity of the pressure-resistant container increases as the resisting pressure depth increases, and the production cost also increases.

Meanwhile, in a pressure-resistant container for use in deep-sea research activities, in addition to strong demands for strength enhancement and weight reduction, there is a need to form a through hole in part of the shell of the pressure-resistant container for the placement of electronic equipment such as a camera inside the pressure-resistant container to check deep sea conditions, or for the attachment of a cable to effect remote operation.

As still another related art, in each of Patent Literatures 2 and 3, there is disclosed an example of formation of a through hole in part of a shell of a pressure-resistant container for use in deep-sea research activities. According to the related art described in Patent Literature 2, an underwater traveling body is provided with a pressure-resistant shell corresponding to a pressure-resistant container. The pressure-resistant shell has a through hole for the placement of an observation window.

According to the related art described in Patent Literature 3, an underwater exploratory apparatus comprises a container main body corresponding to a pressure-resistant container, a front-end flange, and a rear-end flange. The front-end flange and the rear-end flange have a through hole for the attachment of a cable, a driving shaft, and so forth.

CITATION LIST

Patent Literature

Patent Literature 1: Japanese Unexamined Patent Publication JP-A 64-26065 (1989)
Patent Literature 2: Japanese Examined Utility Model Publication JP-Y2 3-52638 (1991)
Patent Literature 3: Japanese Unexamined Patent Publication JP-A 9-301273 (1997)

Non-Patent Literature

Non-Patent Literature 1: "Development Trend of Foreign Deep-sea Technologies", Journal of Japan Deep Sea Technology Association, 2007, No. 3

SUMMARY OF INVENTION

Technical Problem

Most of pressure-resistant containers for use in deep-sea research activities are made of a titanium alloy, an aluminum alloy, or glass. However, in the case of forming a pressure-resistant container of a metal material as practiced in the related art of Patent Literature 1, it is customary to install a buoyant element additionally to secure neutral buoyancy in water. This gives rise to the problem that the entire system becomes large in size and weight. Meanwhile, a spherical glass-made pressure-resistant container for use in deep-sea research activities is utilized when there is a need to impart buoyancy to a pressure-resistant container for an instrument such as a self-floating ocean-bottom seismometer. However, spherical glass-made pressure-resistant containers that have already been put into practical use are able to go down only to a water depth of 6000 m at the maximum, and are therefore not adaptable to a water depth of greater than 6000 m.

As compared with a metal material, ceramics has a higher compressive strength. Moreover, in terms of material properties such as Young's modulus and Poisson's ratio, ceramics is suitable for use in a pressure-resistant structure for deep-sea use purposes. In addition, ceramics excels in corrosion resistance. It is thus to be expected that, in contrast to a pressure-resistant structure made of a metal material, a ceramic pressure-resistant structure can be made lighter to a large extent in weight. For example, in the case of forming a pressure-resistant container adapted to a depth level around 10000 m of ceramics, the weight of the ceramic pressure-resistant container will be about 1/2.5 that of a titanium-made pressure-resistant container.

However, ceramics has a high compressive strength compared to a metal material, but exhibits low strength against tension or bending. In a metallic pressure-resistant container, when it is subjected to stress concentration and consequently the stress on the point of stress concentration exceeds the limit value, then the stress is scattered around due to yielding. That is, it never occurs that the metallic pressure-resistant container is broken down immediately after stress concentration. On the other hand, in a ceramic pressure-resistant container, since ceramics is a brittle material, it follows that yielding will not take place with consequent occurrence of breakage at and around the point of stress concentration. Note that fracture stress is represented by a probability distribution.

By contrast, in a metal material, compressive strength and tensile strength are substantially equal, and fracture stress or proof stress is uniquely defined according to materials, and there is little variation. As has already been described, since metal is a ductile material, it never occurs that a metallic construction is broken down immediately after stress concentration. Although the use of ceramics rather than a titanium alloy is proposed in the related art of Non-Patent Literature 1, the problem is that conventional methods for the design of metallic pressure-resistant containers are not applicable to the design of ceramic pressure-resistant containers.

In particular, when a through hole, such as a through hole for an underwater connector, is formed in a shell of a pressure-resistant container, an area around the through hole is subjected not only to concentration of compressive stress but also to tensile stress. In the deep sea, compressive stress is concentrated on the area around the through hole, and this compressive stress concentration may cause propagation of a crack from the area around the through hole in the shell. In the related arts of Patent Literatures 2 and 3, there is disclosed the pressure-resistant container formed with a through hole, but, as has already been described, the problem is that conventional design methods for pressure-resistant container are not applicable to the design of ceramic pressure-resistant containers. In the metallic pressure-resistant container, a reinforcing portion is provided on the outer side of the shell to increase the strength of the area around the through hole. However, in the design of a ceramic pressure-resistant container, it is necessary to apply a method different from that adopted for the design of the metallic pressure-resistant container.

The glass-made pressure-resistant container also has a through hole for an underwater connector, but it has not been reinforced at the through hole because of lack of a specific design method. Therefore, the level of permissible pressure is limited.

Accordingly, an object of the invention is to provide a shell of a pressure-resistant container that is made of ceramics, is used for a pressure-resistant container formed with a through hole, and can be made higher in strength and lighter in weight, as well as to provide a pressure-resistant container and an exploratory apparatus.

Solution to Problem

The invention provides a shell of a pressure-resistant container including: a shell portion made of ceramics and having a convexly-curved surface; and a thick-walled portion which is made of ceramics, continues into the shell portion, is larger in thickness than the shell portion, and has a through hole penetrating through the thick-walled portion in a thickness direction thereof.

Advantageous Effect of the Invention

According to the invention, in the shell of a pressure-resistant container, the through hole is formed in the thick-walled portion. In this case, in contrast to a case where the through hole is not formed in the thick-walled portion, even with stress concentration which occurs around the through hole due to application of external pressure, the tolerance to the maximum principal stress and the minimum principal stress can be increased. Accordingly, the pressure-resistant container can be made higher in strength, is able to withstand concentration of compressive stress on the area around the through hole, and is less likely to suffer from cracking.

Moreover, the shell of the pressure-resistant container, being made of ceramics, can be made lighter in weight than a metallic pressure-resistant container. This allows effective use of the buoyancy of the pressure-resistant container. Accordingly, a lightweight pressure-resistant container which exhibits buoyancy even in the deep sea can be implemented.

BRIEF DESCRIPTION OF DRAWINGS

FIG. 12 is a view showing an uncrewed exploratory unit 61 equipped with the pressure-resistant container 6, 6a; and FIG. 13 is a view showing a towed deep-sea exploratory apparatus 70 equipped with the pressure-resistant containers 6 and 6a.

DESCRIPTION OF EMBODIMENTS

Figure 1:
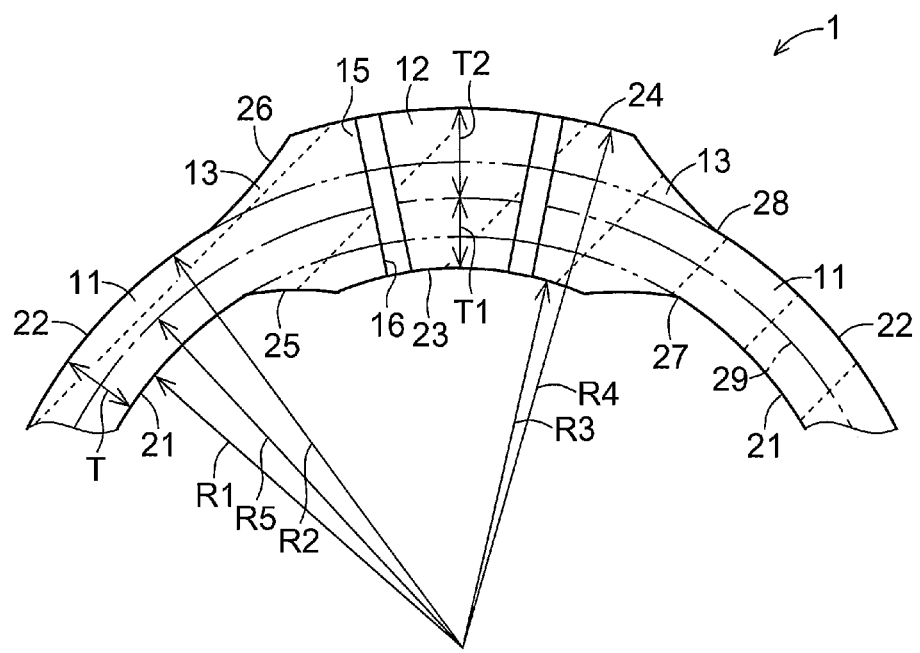
FIG. 1 is a sectional view showing part of a shell 1 of a pressure-resistant container in accordance with one embodiment of the invention.

FIG. 1 is a sectional view showing part of a shell 1 of a pressure-resistant container in accordance with one embodiment of the invention. The shell 1 of a pressure-resistant container includes a shell portion 11 made of ceramics and having a convexly-curved surface, and a thick-walled portion 12 which is made of ceramics, continues into the shell portion 11, is larger in thickness than the shell portion 11, and has a through hole 16 penetrating through the thick-walled portion in a thickness direction thereof. Hereinafter, the shell 1 of a pressure-resistant container will also be referred to simply as "shell 1".

The shell portion 11 is made of ceramics and has a convexly-curved surface. The shell portion 11 is the part of the shell 1 other than the thick-walled portion 12, the thickness of which is smaller than the thickness of the thick-walled portion 12. As shown in FIG. 1, the shell portion 11 is preferably configured to have a shell-portion inner surface 21, which is a first inner surface, defined by part of an imaginary spherical plane having a first radius R1 of predetermined length, and a shell-portion outer surface 22, which is a first outer surface, defined by part of an imaginary spherical plane having a second radius R2 which is longer than the first radius R1. In the shell portion 11, the shell-portion inner surface 21 faces radially inwardly, whereas the shell-portion outer surface 22 faces radially outwardly.

The thick-walled portion 12 continues into the shell portion 11, is larger in thickness than the shell portion 11, and has the through hole 16 penetrating through the thick-walled portion in the thickness direction thereof. The through hole 16 provides communication between a space outside the thick-walled portion 12 and a space inside the thick-walled portion 12. The thick-walled portion 12 acts as reinforcement to make up for the through hole 16. In this case, in contrast to a case where the through hole 16 is not formed in the thick-walled portion but formed in, for example, the shell portion 11, it is possible to lessen the possibility of cracking which occurs when compressive stress is concentrated on the area around the through hole 16.

The thick-walled portion 12 is preferably configured to protrude inwardly beyond the imaginary spherical plane having the first radius R1, as well as to protrude outwardly beyond the imaginary spherical plane having the second radius R2. Moreover, the thick-walled portion 12 is preferably configured to have a thick-walled-portion inner surface 23, which is a second inner surface, defined by part of an imaginary spherical plane having a third radius R3 which is shorter than the first radius R1, and a thick-walled-portion outer surface 24, which is a second outer surface, defined by part of an imaginary spherical plane having a fourth radius R4 which is longer than the second radius R2. In the thick-walled portion 12, the thick-walled-portion inner surface 23 faces radially inwardly, whereas the thick-walled-portion outer surface 24 faces radially outwardly.

In addition, the thick-walled portion 12 has a connecting portion 13 whose thickness decreases gradually with increasing proximity to the shell portion 11. The connecting portion 13 includes a connecting-portion inner surface 25 facing radially inwardly and a connecting-portion outer surface 26 facing radially outwardly. The connecting portion 13 is preferably so shaped that its thickness becomes closer gradually to the thickness of the shell portion 11 circumferentially in a direction from the thick-walled portion 12 to the shell portion 11.

Between the connecting portion 13 and the shell portion 11 are provided an inner surface boundary 27 facing radially inwardly and an outer surface boundary 28 facing radially outwardly. It is preferable that the inner surface boundary 27 serves for smooth connection between the shell-portion inner surface 21 and the connecting-portion inner surface 25, and the outer surface boundary 28 serves for smooth connection between the shell-portion outer surface 22 and the connecting-portion outer surface 26.

In the shell 1, the thickness of the shell portion 11 is defined as a reference wall thickness T. A radial distance between an imaginary spherical plane 29 having a fifth radius R5 which is equal to the average of the first radius R1 and the second radius R2, and the thick-walled-portion inner surface 23, which is the second inner surface, is defined as an inner wall thickness T1. A radial distance between the imaginary spherical plane 29 having the fifth radius R5 and the thick-walled-portion outer surface 24, which is the second outer surface, is defined as an outer wall thickness T2. The ratio of the inner wall thickness T1 to the reference wall thickness T (T1/T) is represented by t1, and the ratio of the outer wall thickness T2 to the reference wall thickness T (T2/T) is represented by t2. At this time, it is preferable that the thick-walled portion 12 of the shell 1 satisfies the following formulae:

$$t2 = 3.8 \times t1 - 3.9 \, (t1 \geq 1.16) \tag{1}$$

and $$1.66 \leq t1 + t2 \leq 4.8 \tag{2}$$

In this case, the shell 1 is free from cracking even if compressive stress is concentrated on the area around the through hole 16 under a pressure of 110 MPa equivalent to a pressure at a depth of 11000 m in the deep sea.

Figure 2:
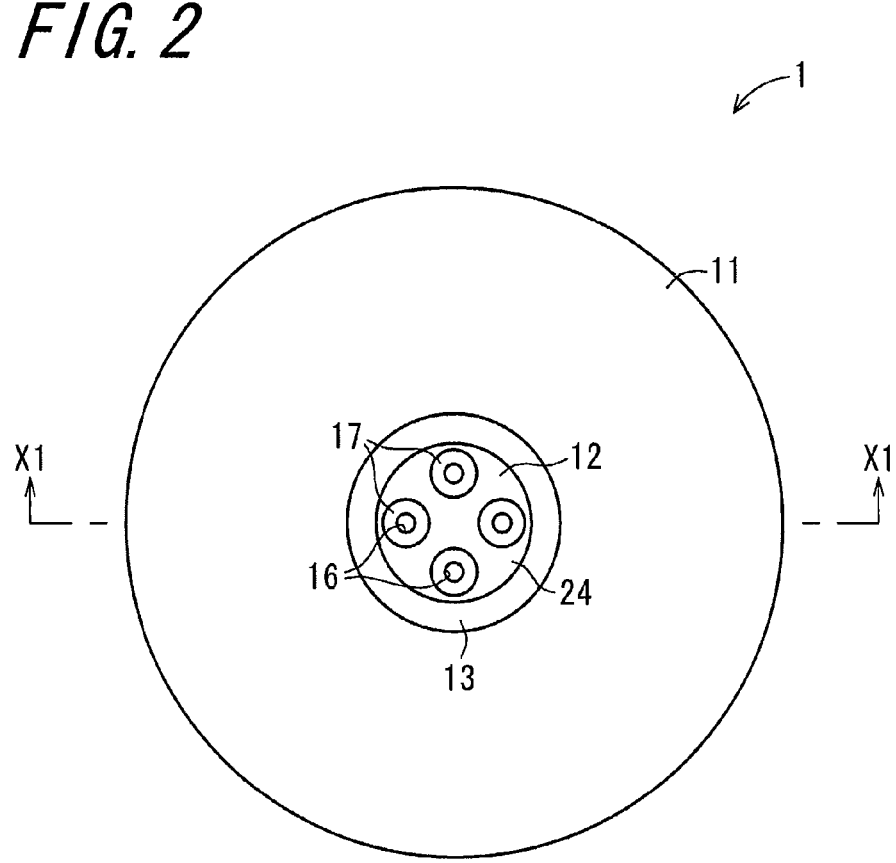
FIG. 2 is a plan view showing the shell 1.
Figure 3:
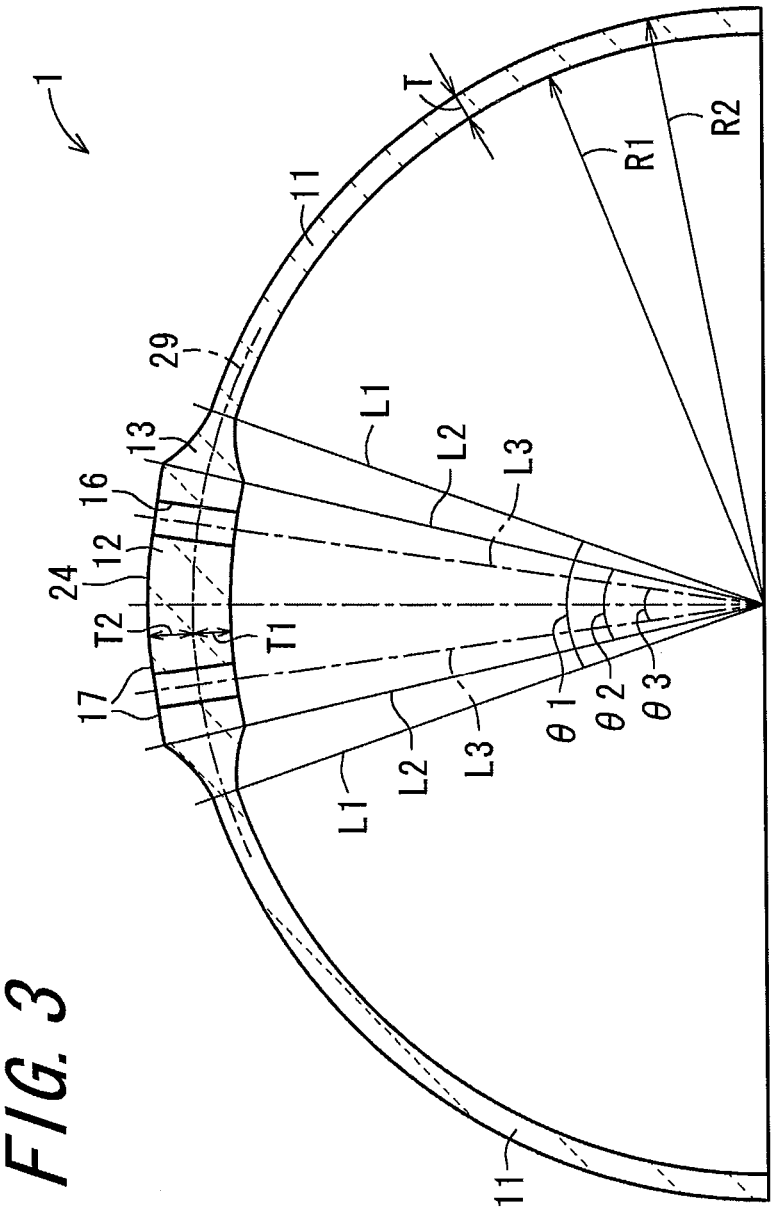
FIG. 3 is a sectional view of the shell 1 taken along the line X1-X1 of FIG. 2.

FIG. 2 is a plan view showing the shell 1. FIG. 3 is a sectional view of the shell 1 taken along the line X1-X1 of FIG. 2. The shell 1 has four through holes 16 in the thick-walled portion 12. As shown in the sectional view of FIG. 3, the shell 1 including the shell portion 11 and the thick-walled portion 12 is preferably semispherical.

Although, in this embodiment, four through holes 16 are formed in the thick-walled portion 12, by way of another embodiment, any number (1 or more) of through holes 16 can be formed in the thick-walled portion 12.

The thick-walled-portion outer surface 24 has flat annular seating faces 17 located around openings of the respective through holes 16.

A straight line connecting the center point of the semispherical shape with the inner surface boundary 27, as well as the outer surface boundary 28 between the connecting portion 13 and the shell portion 11 is represented by L1, and the angle formed by the two straight lines L1 is represented by θ1. A straight line connecting the center point of the semispherical shape with the boundary point of the thick-walled portion 12 where its thickness begins to decrease toward the shell portion 11 is represented by L2, and the angle formed by the two straight lines L2 is represented by θ2. The axis of the through hole 16 is represented by L3, and the angle formed by the two axes L3 is represented by θ3. The degrees of these angles are so determined as to fulfill the relationship: θ1□θ2□θ3. For example, in the shell 1, the angle θ1 falls within the range of 30 to 45°, the angle θ2 falls within the range of 20 to 30°, and the angle θ3 falls within the range of 12 to 20°.

Next, a method for manufacturing the shell 1 will be described. Exemplary of ceramics used for the shell 1 are alumina, zirconia, silicon nitride, and silicon carbide. The following description deals with one example of pressure-resistant container manufacturing methods using such ceramics.

(1) Method of Manufacturing Shell 1 Using Alumina

Raw alumina having an average particle size of about 1 μm and a sintering aid such as CaO, SiO$_2$, and MgO are prepared to form a primary raw material. With respect to 100% by mass of the primary raw material, a binder such as PVA in an amount of 1 to 1.5% by mass, a solvent in an amount of 100% by mass, and a dispersant in an amount of 0.5% by mass are measured. These ingredients are placed in a case of an agitator for mixing and agitating operation to form a slurry. The slurry is granulated by means of spray drying granulation to form a secondary raw material. The secondary raw material is molded by isostatic press (rubber press) molding or powder press molding. After being subjected to cutting operation on an as needed basis, the resultant molded product is fired at a firing temperature in a range of 1550 to 1700° C. in an air atmosphere in a firing furnace. Following the completion of the firing, the molded product is finish-machined, for example, subjected to grinding operation. In this way, a shell 1 made of alumina sintered compact can be obtained.

(2) Method of Manufacturing Shell 1 Using Zirconia

There is prepared a purchased zirconia primary raw material having an average particle size of 0.1 μm formed by the coprecipitation technique under a condition where the amount of addition of $Y_2O_3$ is 3 mol %. With respect to 100% by mass of this primary raw material, a binder in an amount of 3% by mass, a solvent in an amount of 100% by mass, and a dispersant in an amount of 0.5% by mass are measured. These ingredients are placed in a case of an agitator for mixing and agitating operation to form a slurry. The slurry is granulated by means of spray drying granulation to form a secondary raw material. The secondary raw material is molded by the isostatic press (rubber press) molding or powder press molding. After being subjected to cutting operation on an as needed basis, the resultant molded product is fired at a firing temperature in a range of 1300 to 1500° C. in an air atmosphere in a firing furnace. Following the completion of the firing, the molded product is finish-machined, for example, subjected to grinding operation. In this way, a shell 1 made of zirconia sintered compact can be obtained.

(3) Method of Manufacturing Shell 1 Using Silicon Nitride

Raw silicon nitride having an average particle size of 1 μm and a purity in a range of 99 to 99.8%, and a sintering aid such as $Y_2O_3$ and $Al_2O_3$ are prepared to form a primary raw material. With respect to 100% by mass of the primary raw material, a binder in an amount of 1% by mass, a solvent in an amount of 100% by mass, and a dispersant in an amount of 0.5% or less by mass are measured. These ingredients are placed in a case of an agitator for mixing and agitating operation to form a slurry. The slurry is granulated by means of spray drying granulation to form a secondary raw material. The secondary raw material is molded by the isostatic press (rubber press) molding or powder press molding. After being subjected to cutting operation on an as needed basis, the resultant molded product is fired at a maximum firing temperature of 1900° C. in a nitrogen atmosphere in a firing furnace. Following the completion of the firing, the molded product is finish-machined, for example, subjected to grinding operation. In this way, a shell 1 made of silicon nitride sintered compact can be obtained.

(4) Method of Manufacturing Shell 1 Using Silicon Carbide

Raw silicon carbide having an average particle size in a range of 0.5 to 10 μm and a purity in a range of 99 to 99.8%, and a sintering aid such as C (carbon) and B (boron) or $Al_2O_3$ and $Y_2O_3$ are pulverized into particles having an average particle size of 1 μm or less by a pulverizer such as a ball mill. Then, a binder such as polyethylene glycol or polyethylene oxide is added in an adequate amount to the resultant powder to form a slurry. The slurry is granulated by means of spray drying granulation to form a secondary raw material. The secondary raw material is molded by the isostatic press (rubber press) molding or powder press molding. After being subjected to cutting operation on an as needed basis, the resultant molded product is fired at a temperature in a range of 1800 to 2200° C. in a non-oxidizing atmosphere in a firing furnace. Following the completion of the firing, the molded product is finish-machined, for example, subjected to grinding operation. In this way, a shell 1 made of silicon carbide sintered compact can be obtained.

Thus, a ceramics material such as alumina, zirconia, silicon nitride, or silicon carbide can be adopted for use as the material of construction of the shell 1. Also in terms of the result of basic characteristic tests using a small-diameter spherical shell and manufacturing technologies, the use of a ceramics material allows construction of a pressure-resistant container. It is advisable to select an optimum material with consideration given to required characteristics of a pressure-resistant container based on application, how to use, water pressure, and so forth. Alumina is excellent from the viewpoints of manufacturing cost and abrasion resistance against contact with rocks on the seafloor. On the other hand, silicon nitride is excellent from the viewpoints of weight reduction and reliability.

A pressure-resistant container was fabricated by connecting two silicon nitride-made shells 1 together. A pressure test has been performed on the pressure-resistant container in a condition of water pressure of 110 MPa to examine pressure-resistant characteristics. Note that, in the pressure test, a metal lid was attached to the seating face 17 via an O-ring to maintain watertightness.

Subsequently, in order for the shell 1 of the present embodiment to prove itself, in addition to the above-described water pressure test, a check of stress distribution was conducted by the finite element analysis. As conditions therefor, silicon nitride having a Young's modulus of 300 GPa and a Poisson's ratio of 0.26 was used as the material for the shell 1, and water pressure was set at 110 MPa.

Figure 4:
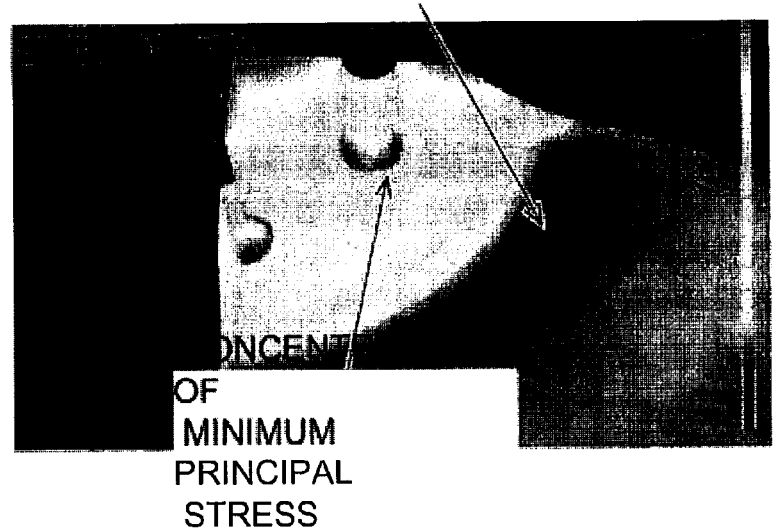
FIG. 4 is a view showing a distribution of a minimum principal stress as observed in an interior of the shell 1.
Figure 5:
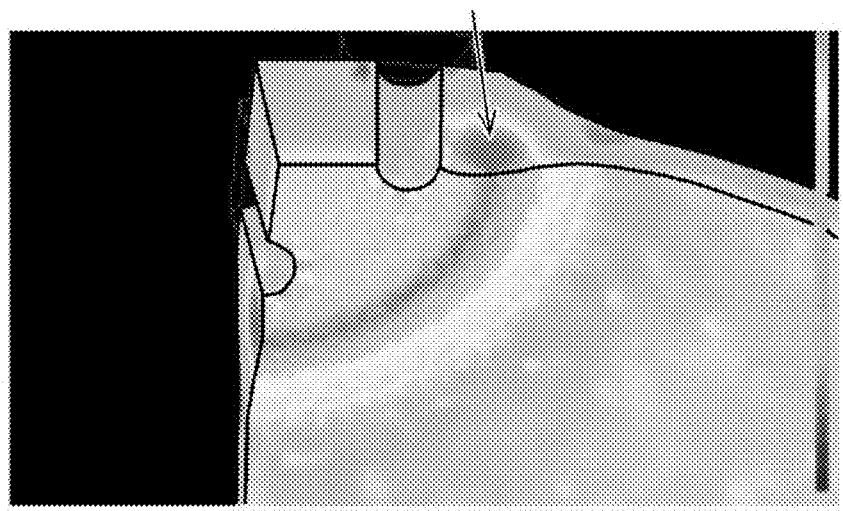
FIG. 5 is a view showing a distribution of a maximum principal stress as observed in the interior of the shell 1.

FIG. 4 is a view showing a distribution of a minimum principal stress as observed in an interior of the shell 1. FIG. 5 is a view showing a distribution of a maximum principal stress as observed in an interior of the shell 1. FIGS. 4 and 5 show the result of analysis of a ceramic pressure-resistant container constructed of the shell 1 shown in FIG. 2.

As will be understood from FIG. 4, the concentration of the minimum principal stress occurs around the through hole 16 at the thick-walled-portion inner surface 23 and also occurs around the inner surface boundary 27. The local maximum value of the stress concentration occurring around the through hole 16 and the local maximum value of the stress concentration occurring around the inner surface boundary 27 are substantially equal, and the values are each about one-half of an average of the unconfined compressive strengths of the materials. Moreover, as will be understood from FIG. 5, the concentration of the maximum principal stress occurs around the inner surface boundary 27. The value of the stress concentration is far smaller than tensile strength of the material.

Figure 6:
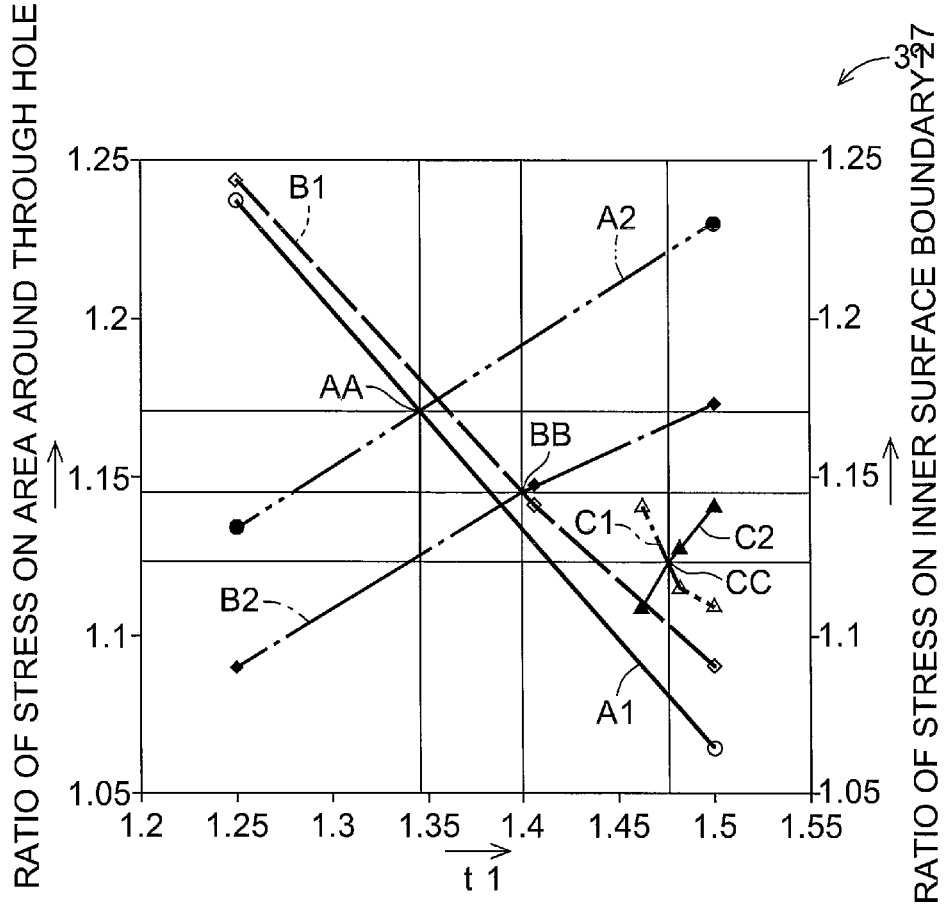
FIG. 6 is a graph 31 showing the relationship between the values of t1 (=T1/T), t2 (=T2/T) and the local maximum values of the minimum principal stress on an area around a through hole 16 at a thick-walled-portion inner surface 23 and that on an area around an inner surface boundary 27.

FIG. 6 is a graph 31 showing the relationship between the values of t1 (=T1/T), t2 (=T2/T) and the local maximum values of the minimum principal stress on the area around the through hole 16 at the thick-walled-portion inner surface 23 and that on the area around the inner surface boundary 27. In the graph 31, the left ordinate axis represents the ratio of stress in which the denominator is −1560 MPa which is the value of the minimum principal stress on that part of the 8 mm-thick shell portion 11 in spherical form which is located far enough away from the through hole 16 and the numerator is the value of the minimum principal stress on the area around the through hole 16; the right ordinate axis represents the ratio of stress in which the denominator is the same as above and the numerator is the value of the minimum principal stress on the area around the inner surface boundary 27; and the abscissa axis represents the value of t1.

The graph 31 shows six polygonal lines A1, A2, B1, B2, C1, and C2. A point of intersection of the polygonal lines A1 and A2 is designated by AA, a point of intersection of the polygonal lines B1 and B2 is designated by BB, and a point of intersection of the polygonal lines C1 and C2 is designated by CC.

The polygonal line A1 indicates the relationship between the value of t1 and the stress ratio of the area around the through hole 16 in a condition where t2 takes on a value of 1.25. The polygonal line A2 indicates the relationship between the value of t1 and the stress ratio of the area around the inner surface boundary 27 in a condition where t2 takes on a value of 1.25.

The polygonal line B1 indicates the relationship between the value of t1 and the stress ratio of the area around the through hole 16 in a condition where t2 takes on a value of 1.5. The polygonal line B2 indicates the relationship between the value of t1 and the stress ratio of the area around the inner surface boundary 27 in a condition where t2 takes on a value of 1.5.

The polygonal line C1 indicates the relationship between the value of t1 and the stress ratio of the area around the through hole 16 in a condition where t2 takes on a value of 1.75. The polygonal line C2 indicates the relationship between the value of t1 and the stress ratio of the area around the inner surface boundary 27 in a condition where t2 takes on a value of 1.75.

Upon setting t2 at a fixed value, the larger the value of t1 becomes, the smaller the stress ratio of the area around the through hole 16 becomes, and contrariwise the larger the stress ratio of the area around the inner surface boundary 27 becomes. That is, t1 values at which the local maximum values of the minimum principal stresses on the area around the through hole 16 and the area around the inner surface boundary 27 are minimized are indicated by the intersection points AA, BB, and CC, and correspondingly the permissible water pressure reaches a maximum level. The value of t1 at which the minimum principal stress takes on a minimum value varies depending on the value of t2.

Where a combination of the value of t1 at which the local maximum value of the minimum principal stress is minimized and the value of t2 is concerned, as shown in graph 31, the intersection point AA indicates that t1 takes on a value of 1.346 when the value of t2 is 1.25; the intersection point BB indicates that t1 takes on a value of 1.4 when the value of t2 is 1.5; and the intersection point CC indicates that t1 takes on a value of 1.476 when the value of t2 is 1.75.

Figure 7:
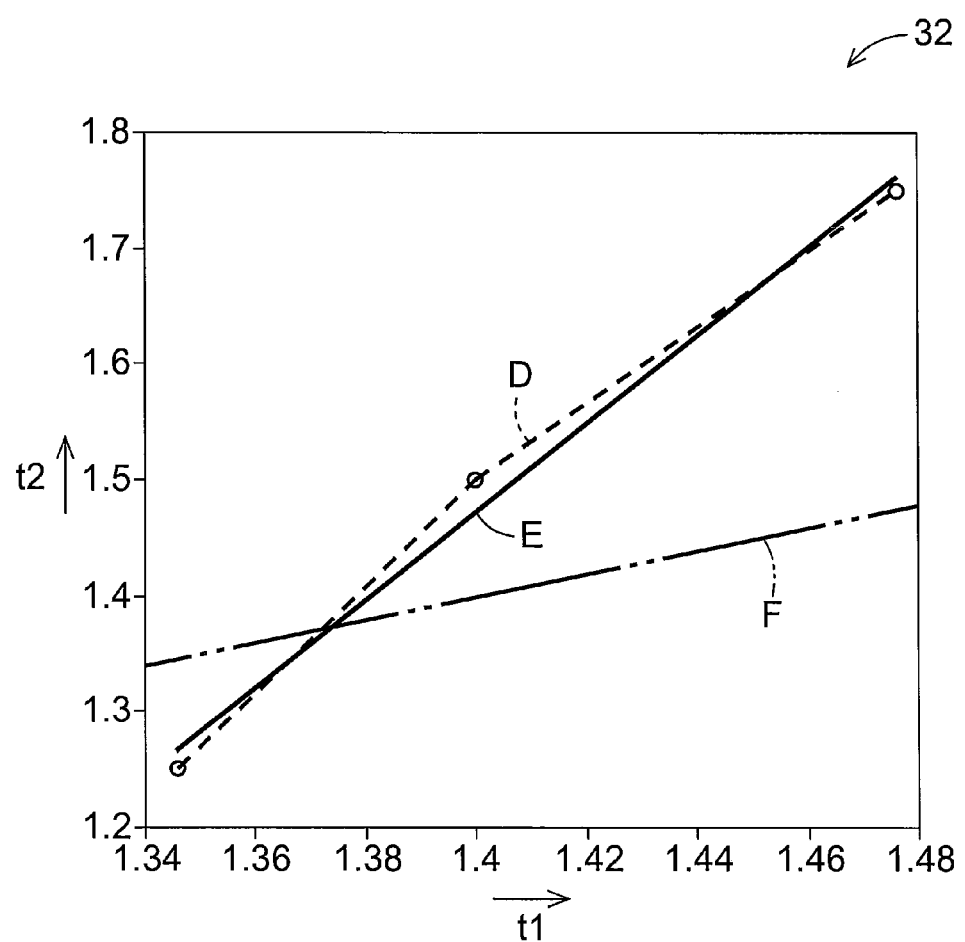
FIG. 7 is a graph 32 showing combinations of the value of t1 and the value of t2 at the intersection points AA, BB, and CC plotted in the graph 31 of FIG. 6.

FIG. 7 is a graph 32 showing combinations of the value of t1 and the value of t2 at the intersection points AA, BB, and CC plotted in the graph 31 of FIG. 6. In the graph 32 of FIG. 7, the ordinate axis represents the value of t2 and the abscissa axis represents the value of t1.

A polygonal line D plotted in the graph 32 indicates the combinational relationship between the value of t1 at which the local maximum value of the minimum principal stress is minimized and the value of t2. A substantially linear relationship is found between the value of t1 and the value of t2, and this relationship is expressed by a straight line E as an approximate line in the graph 32. On the basis of the straight line E, the following relational expression is derived by the least-square method in a condition where the abscissa axis is designated by x and the ordinate axis is designated by y:

$$y=3.8098x-3.8616, R=0.99526$$

wherein R represents a coefficient of determination.

An optimum combination of the value of t1 and the value of t2 can be expressed by the following formula (1). Although this correlation varies depending on the diameter of the opening of the shell 1, the diameter of the through hole 16, the size of the connecting portion 13, and so forth, it has already been confirmed that the rate of variation is not so high by the finite element analysis. The variation range of the value of t2 is about ±30% of a value obtained by means of the formula (1). Note that a straight line F indicates a case where both t1 and t2 take on a value of 1.

$$t2=3.8 \times t1-3.9 (t1 \geq 1.16) \qquad (1)$$

It is noted that, in a case where the thick-walled portion 12 is not configured to protrude outwardly beyond the imaginary spherical plane having the second radius R2, t2 takes on a value of 0.5 which is one-half of the corresponding value of the shell portion 11. Given that the value of t2 is 0.5, t1 is obtained by calculation according to the formula (1). The calculated value is 1.16, wherefore the lower limit of t1 is 1.16.

Figure 8:
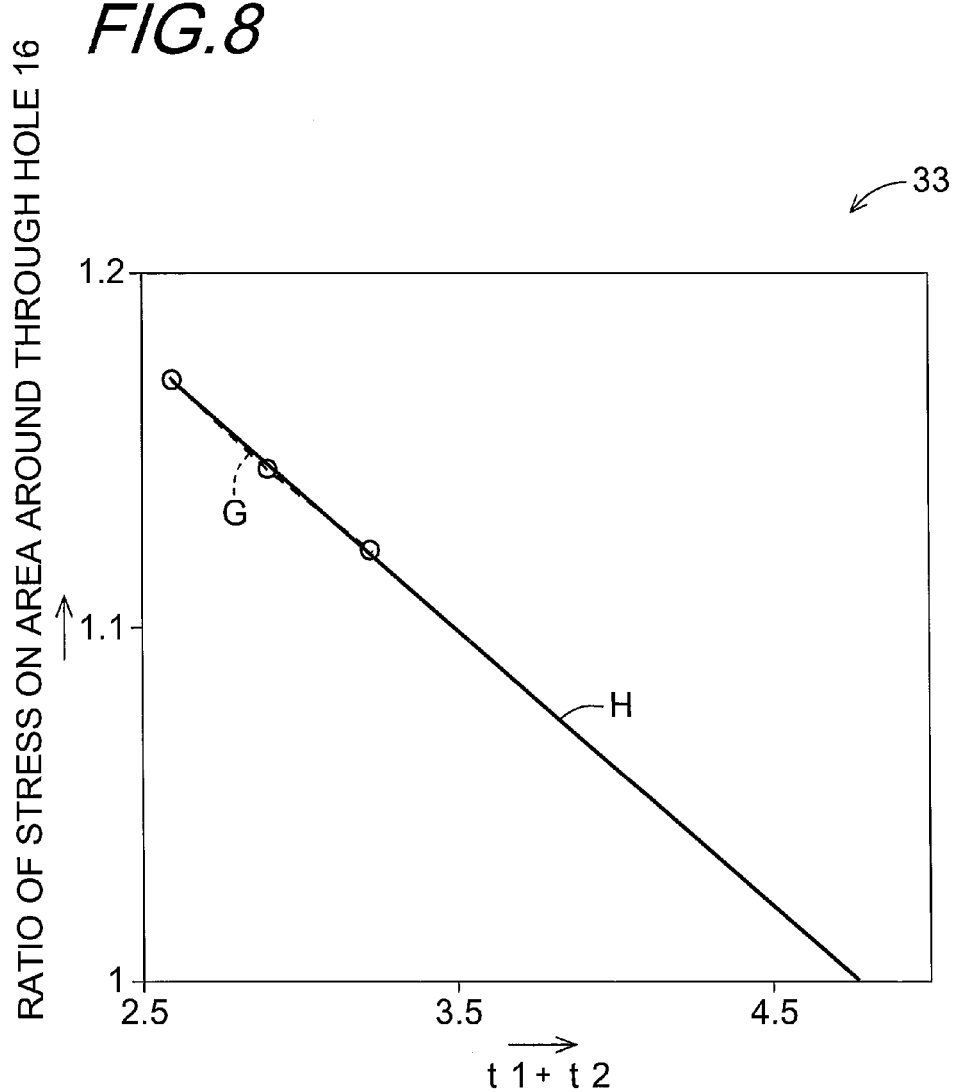
FIG. 8 is a graph 33 showing the local maximum value of the minimum principal stress plotted against a combination of the value of t1 and the value of t2 shown in the graph 32 of FIG. 7.

FIG. 8 is a graph 33 showing the local maximum value of the minimum principal stress plotted against a combination of the value of t1 and the value of t2 shown in the graph 32 of FIG. 7. In the graph 33 of FIG. 8, the abscissa axis represents the value of the sum of the value of t1 and the value of t2, and the ordinate axis represents the ratio of stress in which the denominator is −1560 MPa which is the value of the minimum principal stress on that part of the 8 mm-thick shell portion 11 in spherical form which is located far enough away from the through hole 16 and the numerator is the value of the minimum principal stress on the area around the through hole 16.

A polygonal line G is drawn on the basis of the input of t1+t2 sum values at the intersection points AA, BB, and CC shown in the graph 31 and the local maximum value of the minimum principal stress. A straight line H is an approximate line for the polygonal line G, and the following relational expression is derived by the least-square method in a condition where the abscissa axis is designated by x and the ordinate axis is designated by y:

$$y=-0.076123x+1.367, R=0.99902$$

The larger the value of t1 and the value of t2 become, the smaller the local maximum value of the minimum principal stress on the area around the through hole 16 becomes. However, when the value of t1+t2 exceeds 4.8, then the local maximum value of the minimum principal Stress on the area around the through hole 16 becomes smaller than the value of the minimum principal stress on the shell portion 11. In consequence, the effect of reinforcement is produced to an excessive degree, which results in an increase in the mass of the shell 1 and correspondingly a decrease in the buoyancy of the pressure-resistant container. In this regard, as has already been described, since t2 takes on a value of 0.5 where the thick-walled portion 12 is not configured to protrude outwardly and the value of t1 at that time is 1.16, it follows that the lower limit of the value of t1+t2 is 1.66. Accordingly, in so far as the value of t1+t2 satisfies the following formula (2), it is possible to achieve reasonable enhancement in reinforcement effect.

$$1.66 \leq t1+t2 \leq 4.8 \qquad (2)$$

By adjusting the value of t1+t2 to fall within the above prescribed range, it is possible to render the shell 1 having the through hole 16 excellent in pressure-resistant capability and lighter in weight without producing an excessive reinforcement effect.

Thus, the shell 1 of a pressure-resistant container comprises the shell portion 11 and the thick-walled portion 12. The shell portion 11 is made of ceramics and has a convexly-curved surface. The thick-walled portion 12 is made of ceramics, continues into the shell portion 11, is larger in thickness than the shell portion 11, and has the through hole 16 penetrating through the thick-walled portion in the thickness direction thereof.

In the shell 1, the through hole 16 is formed in the thick-walled portion 12. In this case, even with stress concentration which occurs around the through hole 16 due to application of external pressure, in contrast to the case where the through hole 16 is formed in the shell portion 11, the tolerance to the maximum principal stress and the minimum principal stress can be increased. Accordingly, a pressure-resistant container including at least the shell 1 according to the invention can be made higher in strength, and is thus able to withstand the concentration of compressive stress on the area around the through hole with a consequent lessening of the possibility of cracking.

Moreover, since the shell 1 of the pressure-resistant container is made of ceramics, this pressure-resistant container can be made lighter in weight than a pressure-resistant container made of metal, wherefore the buoyancy of the pressure-resistant container can be utilized effectively. This makes it possible to implement a lightweight pressure-resistant container which exhibits buoyancy even in the deep sea.

Further, the shell portion 11 includes the shell-portion inner surface 21 and the shell-portion outer surface 22. It is preferable that the shell-portion inner surface 21 is defined by part of the imaginary spherical plane having the first radius R1 of predetermined length, and the shell-portion outer surface 22 is defined by part of the imaginary spherical plane having the second radius R2 which is longer than the first radius R1. The thick-walled portion 12 includes the thick-walled-portion inner surface 23 and the thick-walled-portion outer surface 24. It is preferable that the thick-walled-portion inner surface 23 is defined by part of the imaginary spherical plane having the third radius R3 which is shorter than the first radius R1, and the thick-walled-portion outer surface 24 is defined by part of the imaginary spherical plane having the fourth radius R4 which is longer than the second radius R2.

In the shell 1 of the pressure-resistant container, of a thick-walled portion 12 configured so that only either of the outer wall thickness T2 and the inner wall thickness T1 is increased and a thick-walled portion 12 configured so that both the inner wall thickness T1 and the outer wall thickness T2 are increased, the latter is preferred over the former. The latter thick-walled portion configuration enables the dispersion of stress on the area around the through hole 16 with a consequent improvement in pressure-resistant capability.

Moreover, the shell 1 including the shell portion 11 and the thick-walled portion 12 is preferably made of silicon nitride sintered compact having a relative density of 98% or more. In the case of forming the shell 1 of silicon nitride sintered compact having a relative density of 98% or more, pores existing at the surface of the shell 1 are fewer in number, wherefore the concentration of stress on the pores can be lessened. Accordingly, the shell 1 becomes resistant to cracking and is thus less likely to suffer from damage and fracture. In addition, silicon nitride sintered compact is lower in specific gravity and far higher in bending strength and compressive strength than other different ceramics. Therefore, even if the surface of the shell 1 made of silicon nitride sintered compact is subjected to great water pressure in the deep sea, occurrence of cracking in the shell 1 can be prevented.

It is noted that the shell 1 made of silicon nitride sintered compact having a relative density of 98% or more can be formed by the manufacturing method as described earlier with use of a primary raw material in which the content of a sintering aid such as $Y_2O_3$ and $Al_2O_3$ falls within the range of 2 to 20 parts by mass, and the rest is raw silicon nitride.

Further, the shell 1 including the shell portion 11 and the thick-walled portion 12 is preferably made of alumina sintered compact having a hardness of 15 GPa or more. In the case of forming the shell 1 of alumina sintered compact having a hardness of 15 GPa or more, the shell 1 is able to withstand a pressure of 110 MPa equivalent to a pressure at a depth of 11000 m in the deep sea, and is less prone to abrasion caused by contact with rocks on the seafloor and thus exhibits great resistance to abrasion. That is, alumina sintered compact is desirable for use as the material of construction of the shell 1.

It is noted that the shell 1 made of alumina sintered compact having a hardness of 15 GPa or more can be formed by the manufacturing method as described earlier with use of a primary raw material in which the content of a sintering aid such as CaO, $SiO_2$, and MgO is 1.5 parts by mass or less, and the rest is raw alumina. In the interest of further increase in hardness, it is advisable to add boric acid in an amount of 0.1 to 2% by mass with respect to 100% by mass of the primary raw material to form a hard phase of aluminum boride in the alumina sintered compact.

Example 1

As a model, there was prepared a shell 1 having a through hole which has a diameter of 11.6 mm, in which the reference wall thickness T is 7.66 mm that is the thickness of the shell portion 11 and the values of the inner wall thickness T1 and the outer wall thickness T2 is 3.83 mm, respectively; that is, the thick-walled portion 12 was not formed. A pressure distribution analysis has been performed on the model by the finite element analysis under a pressure of 110 MPa equivalent to a pressure at a depth of 11000 m in the deep sea. In this construction, the first radius R1 was set at 210 mm. Moreover, the value of the minimum principal stress on that part of the 7.66 mm-thick shell portion 11 in spherical form which is located far enough away from the through hole 16 was found to be −1620 MPa.

TABLE 1

| | Reference wall thickness (thickness of shell portion 11) (mm) | Inner wall thickness T1 (mm) | Outer wall thickness T2 (mm) | θ1 (°) | θ2 (°) | Diameter of through hole 16 (mm) | Seating face 17 (mm) | Connecting portion 13 | Minimum principal stress Around through hole 16 (MPa) | Minimum principal stress Inner surface boundary 27 (MPa) | Maximum principal stress Around through hole 16 (MPa) |
|---|---|---|---|---|---|---|---|---|---|---|---|
| Condition 1 | 7.66 | 3.83 | 3.83 | — | — | 11.6 | φ30 | — | −3478 | — | 16 |

Table 1 shows the result of analysis of the shell 1 in which no thick-walled portion 12 was formed around the through hole 16. The value of the minimum principal stress on that part of the shell portion 11 in spherical form which is located far enough away from the through hole 16 is −1620 MPa, whereas the value of the minimum principal stress on the internal through hole is −3478 MPa. That is, the ratio of stress in which the denominator is the value of the minimum principal stress on the shell portion 11 and the numerator is the value of the minimum principal stress on the area around the through hole 16 is 2.1. In other words, the area around the through hole 16 is subjected to the concentration of stress of about 2.1 times as large as that on the distant part of the shell portion. The value 2.1 is in close agreement with a stress concentration factor of 2.0 which is obtained when an infinite plate having one circular hole is subjected to tensile stress or compressive stress in two directions that are perpendicular to each other; that is, when tensile stress or compressive stress is exerted centripetally on the circular hole (refer to Masataka NISHIDA, "Stress Concentration", p. 222 to 223, Morikita Publishing Co., Ltd.). The stress concentration factor of the infinite plate is not dependent on the hole diameter.

Example 2

Table 2 shows the result of a pressure distribution analysis, based on the finite element analysis, that has been performed on a model of the shell 1 having dimensions as shown in Table 2 under a pressure of 110 MPa equivalent to a pressure at a depth of 11000 m in the deep sea. The through hole 16 of Condition 2 and the through hole 16 of Condition 3 have different diameters, namely a diameter of 11.6 mm and a diameter of 12.8 mm, respectively. The ratio of stress for the area around the through hole 16 stands at 1.39 in Condition 2, yet stands at 1.43 in Condition 3. When the hole diameter was increased to 1.1 times, then the stress ratio was increased to 1.035 times. According to the result of the examination of Example 2 and the examination of Example 1 as well, the influence of variation of the hole diameter on the ratio of stress is not so significant.

Example 3

Table 3 shows the result of a pressure distribution analysis, based on the finite element analysis, that has been performed on a model of the shell 1 having dimensions as shown in Table 2 under a pressure of 110 MPa equivalent to a pressure at a depth of 11000 m in the deep sea. The connecting portion 13 of Condition 4 and the connecting portion 13 of Condition 5 have different ranges, and more specifically the angle θ was set at 38° and the angle θ2 was set at 26° in Condition 4, and the angle θ1 was increased to 44° and the angle θ2 was set at 26° in Condition 5. The result showed that the increase of the connecting portion 13 range exerts little influence on the local maximum value of the minimum principal stress. The local maximum value of the maximum principal stress is decreased with an increase in the connecting portion 13 range, but, the local maximum value of the minimum principal stress is basically small. It is for this reason that there is little influence.

TABLE 3

| | Reference wall thickness (thickness of shell portion 11) (mm) | Inner wall thickness T1 (mm) | Outer wall thickness T2 (mm) | θ1 (°) | θ2 (°) | Diameter of through hole 16 (mm) | Seating face 17 (mm) | Connecting portion 13 | Minimum principal stress Around through hole 16 (MPa) | Minimum principal stress Inner surface boundary 27 (MPa) | Maximum principal stress Around through hole 16 (MPa) |
|---|---|---|---|---|---|---|---|---|---|---|---|
| Condition 4 | 8.00 | 11.85 | 14.00 | 38 | 26 | 12.8 | φ32 | R50 | −1740 | −1760 | 42 |
| Condition 5 | 8.00 | 11.85 | 14.00 | 44 | 26 | 12.8 | φ32 | R50 | −1740 | −1780 | 18 |

Example 4

There were formed a titanium alloy-made shell and an alumina-made shell that are each semispherical, have a thick-walled portion 12 whose thickness is greater than the reference wall thickness T of the shell portion 11, and have a plurality of through holes 16 formed in the thick-walled portion 12. Moreover, a titanium alloy-made pressure-resistant container and an alumina-made pressure-resistant container were fabricated with use of the shells 1 thusly formed. A comparison has been made between the pressure-resistant containers in terms of weight and the amount of deformation resulting from application of pressure in a pressurization water tank.

It has been found out that, compared with a titanium alloy (having a specific gravity of 4.5 and a Young's modulus in the neighborhood of 100 GPa), alumina (having a specific gravity in a 3.8 to 3.9 range and a Young's modulus of 350 GPa) has a lower specific gravity and can thus be made lighter in weight, and has a higher Young's modulus and is

TABLE 2

| | Reference wall thickness (thickness of shell portion 11) (mm) | Inner wall thickness T1 (mm) | Outer wall thickness T2 (mm) | θ1 (°) | θ2 (°) | Diameter of through hole 16 (mm) | Seating face 17 (mm) | Connecting portion 13 | Minimum principal stress Around through hole 16 (MPa) | Minimum principal stress Inner surface boundary 27 (MPa) | Maximum principal stress Around through hole 16 (MPa) |
|---|---|---|---|---|---|---|---|---|---|---|---|
| Condition 2 | 7.66 | 7.66 | 7.66 | 40 | 30 | 11.6 | φ30 | R50 | −2252 | −1740 | 38 |
| Condition 3 | 7.66 | 7.66 | 7.66 | 30 | 24 | 12.8 | φ30 | R50 | −2330 | −1730 | 56 | thus less prone to deformation. It has also been found out that the alumina-made pressure-resistant container is more resistant to propagation of a crack from part of the through hole 16 and ensuing breakage even under stress concentration occurring around the through hole 16 due to water pressure.

Example 5

There were formed three shells 1 of different types for constituting pressure-resistant containers, namely the shell (1) with the thick-walled portion 12, which has a plurality of through holes 16, thickened only in an inward direction; the shell (2) with the thick-walled portion 12 thickened only in an outward direction; and the shell (3) with the thick-walled portion 12 thickened both in the outward direction and the inward direction. A pressure test has been performed on each of the shells. Under a preset pressure of 50 MPa equivalent to a pressure at a water depth of 5000 m, all of the shells (1), (2), and (3) showed no sign of cracking and breakage. On the other hand, under a preset pressure of 110 MPa equivalent to a pressure at a depth of 11000 m in the deep sea, the shells (1) and (2) suffered from a slight crack developed around the through hole 16, whereas the shell (3) was free from cracking and thus proved itself.

Example 6

With use of alumina, zirconia, silicon nitride, and silicon carbide as materials, shells 1 were formed in the same manner as adopted in Example 4, and pressure-resistant containers were fabricated with use of the thusly formed shells 1. Then, a pressure test has been performed on each of the pressure-resistant containers under a pressure of 110 MPa equivalent to a pressure at a depth of 11000 m in the deep sea. The result of the pressure tests showed that the pressure-resistant containers made of the above-described materials proved themselves without showing any sign of cracking. After that, an additional pressure test has been performed on each of them under an increased pressure. As a result, it has been found out that silicon nitride is the most excellent material and alumina is the second best.

Example 7

Shells 1 were formed with use of alumina and silicon nitride as materials. Note that the alumina material and the silicon nitride material in use have a hardness of 15 GPa and a hardness of 14 GPa, respectively, in terms of Vickers hardness measured in conformity with the JIS R 1610-2003.

An abrasion test has been performed on each of the shells 1 based on an expectation of contact with rocks on the seafloor. In the abrasion test, a whetstone, which was formed by machining a seabed rock into a predetermined shape, has been dipped in sea water while being rotated for contact with the shell 1. The result of the abrasion tests showed that alumina is smaller in the degree of wear and is thus higher in abrasion resistance than silicon nitride.

Accordingly, as seen from Example 6, the shell 1 is able to withstand a pressure of 110 MPa equivalent to a pressure at a depth of 11000 m in the deep sea and thus exhibits excellent abrasion resistance so long as it is made of alumina sintered compact having a hardness of 15 GPa or more. That is, alumina sintered compact was found to be ideally suited for use as the material for the shell 1.

Example 8

Silicon nitride-made shells 1 were formed that differ from each other in respect of the reference wall thickness T of the shell portion 11, and the inner wall thickness T1 and outer wall thickness T2 of the thick-walled portion 12. Then, pressure-resistant containers were constructed with use of the thusly formed shells 1 with subsequent pressure tests and mass measurement of the pressure-resistant containers. For the case where the value of t1+t2 exceeded 4.8, although there was no sign of cracking during the pressure test, the mass of the pressure-resistant container was increased with a consequent decrease in buoyancy. In point of pressure resistance, the pressure-resistant container using the shell 1 having dimensions that satisfy the formulae (1) and (2) was superior to the pressure-resistant container using the shell having dimensions that do not satisfy the formulae (1) and (2), for example, the pressure-resistant container using the shell 1 having dimensions t1=1 and t2=0.5, or having dimensions t1=0.8 and t2=1. As will be understood from the foregoing, the fulfillment of the formulae (1) and (2) makes it possible to obtain a pressure-resistant container which has a through hole 16, yet is reinforced at the area around the through hole 16 in an adequate thickness for attainment of a strength high enough to withstand deep-sea pressure, and has the advantages of lightness in weight and little buoyancy reduction.

Figure 9:
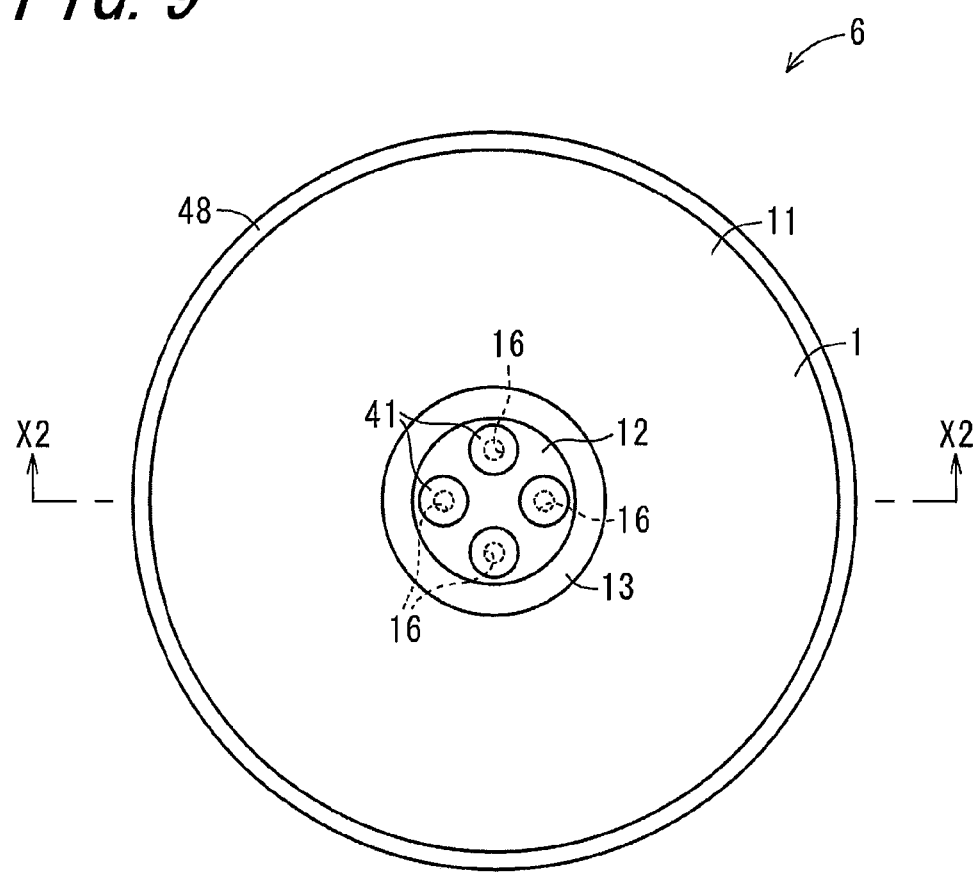
FIG. 9 is a plan view showing a pressure-resistant container 6 using the shell 1 in which an underwater connector 41 is fitted in the through hole 16.
Figure 10:
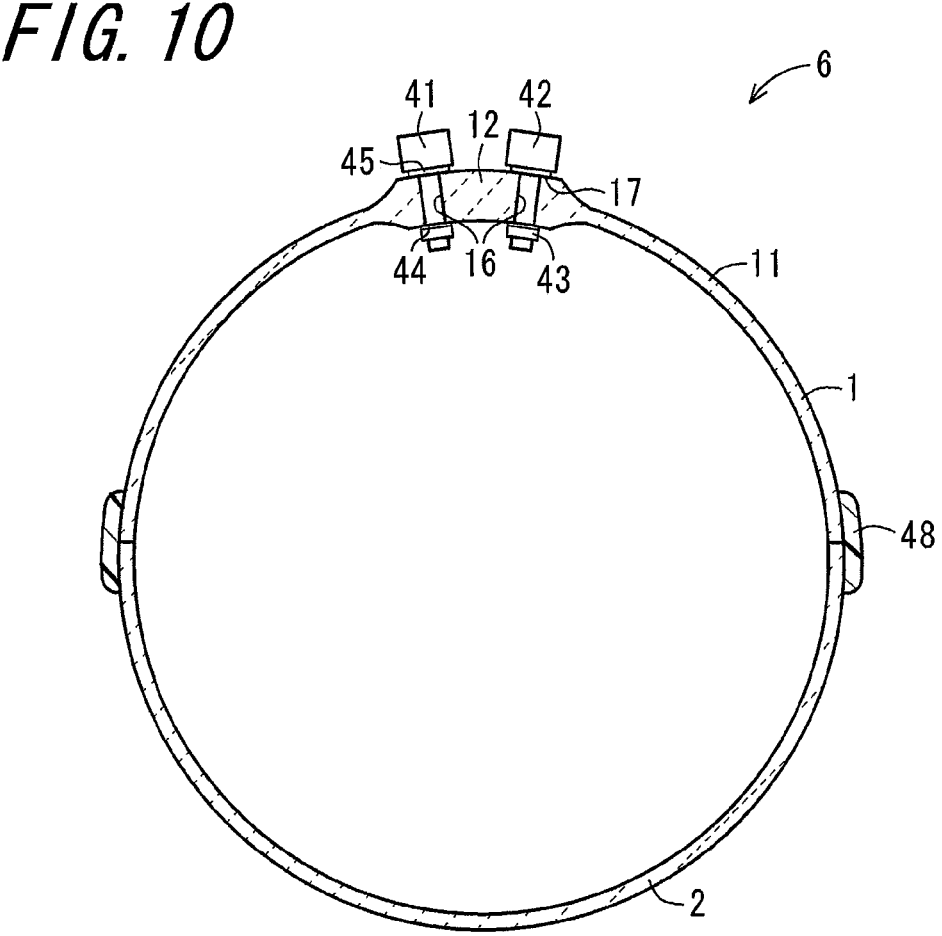
FIG. 10 is a sectional view of the pressure-resistant container 6 using the shell 1 taken along the line X2-X2 of FIG. 9.

FIG. 9 is a plan view showing a pressure-resistant container 6 using a shell 1 in which an underwater connector 41 is fitted in the through hole 16. FIG. 10 is a sectional view of the pressure-resistant container 6 using the shell 1 taken along the line X2-X2 of FIG. 9.

Upon the fitting-in of a plug from outside in the radial direction, the electrical connection of the underwater connector 41 is established in the range between the exterior and the interior of the pressure-resistant container 6. The underwater connector 41 includes a connector main body 42, a nut 43, a washer 44, and an O-ring 45. The connector main body 42 has the form of a bolt, and is threadedly engaged with the nut 43 via the washer 44. The connector main body 42 has a built-in internal electric wire. The connector main body 42 is inserted from outside in the radial direction into the through hole 16 of the thick-walled portion 12, and is fixed in place. The surface of the connector main body 42 in contact with the seating face 17 is flat-shaped. The watertightness of the pressure-resistant container 6 can be secured by bringing the connector main body 42 into contact with the seating face 17 via the O-ring 45.

The pressure-resistant container 6 includes the shell 1 and a second shell 2. Just like the shell 1, the second shell 2 is made of ceramics. The second shell 2 is not designed to have the through hole 16, and thus includes a shell portion 11 having a uniform thickness defined by a semispherical shape. In the pressure-resistant container 6, by attaching a fusible tape 48 of rubber or the like to the juncture of the shell 1 and the second shell 2 exteriorly thereof, it is possible to secure watertightness. Alternatively, by forming a flange on each of the shells and fastening them together with a bolt and a nut, it is possible to secure watertightness.

Although, in this embodiment, the shell 1 and the second shell 2 constitute the pressure-resistant container 6, by way of another embodiment, the pressure-resistant container 6 can be constructed of two shells 1.

Figure 11:
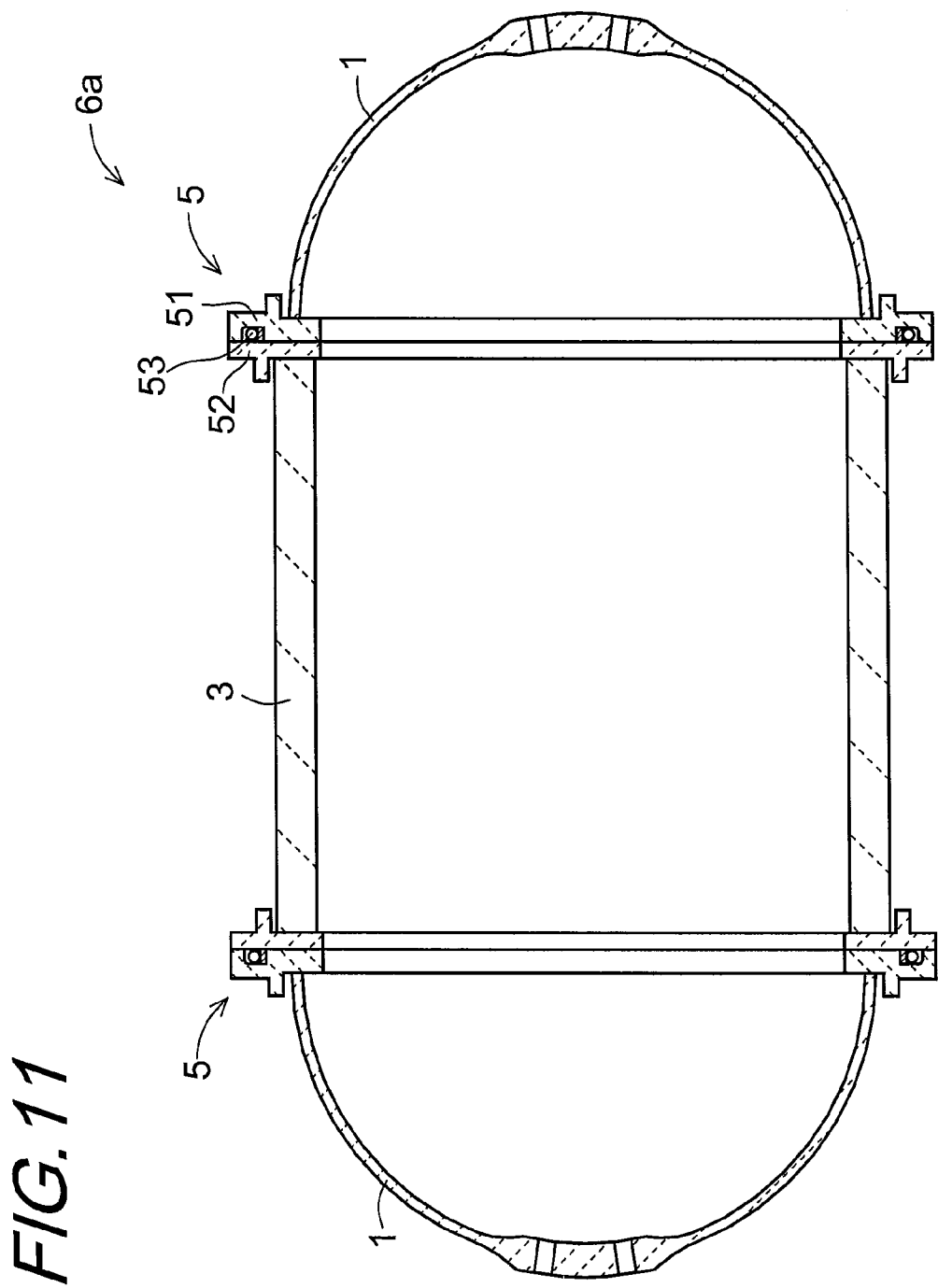
FIG. 11 is a sectional view showing a pressure-resistant container 6a employing the shell 1 and a third shell 3.

FIG. 11 is a sectional view showing a pressure-resistant container 6a employing the shells 1 and a third shell 3. The third shell 3 is made of ceramics and has the shape of a right circular cylinder. The pressure-resistant container 6a is constructed by joining the shells 1 to opposite ends of the third shell 3 via connecting bodies 5 so as to obtain a capsule-like configuration. For example, the connecting body 5 is composed of a first connecting member 51 located toward the shell 1, a second connecting member 52 located toward the third shell 3, and an annular ring member 53 interposed between the first connecting member 51 and the second connecting member 52. The first and second connecting members 51 and 52 constituting the connecting body 5 are preferably made of a material which is smaller in modulus of elasticity than the shells 1 and the third shell 3. In this case, the stress generated at each of edges of the shell 1 and the third shell 3 can be dispersed, thereby lessening or eliminating the discontinuity of stress. This allows improvement in pressure-resistant capability and watertightness.

Figure 12:
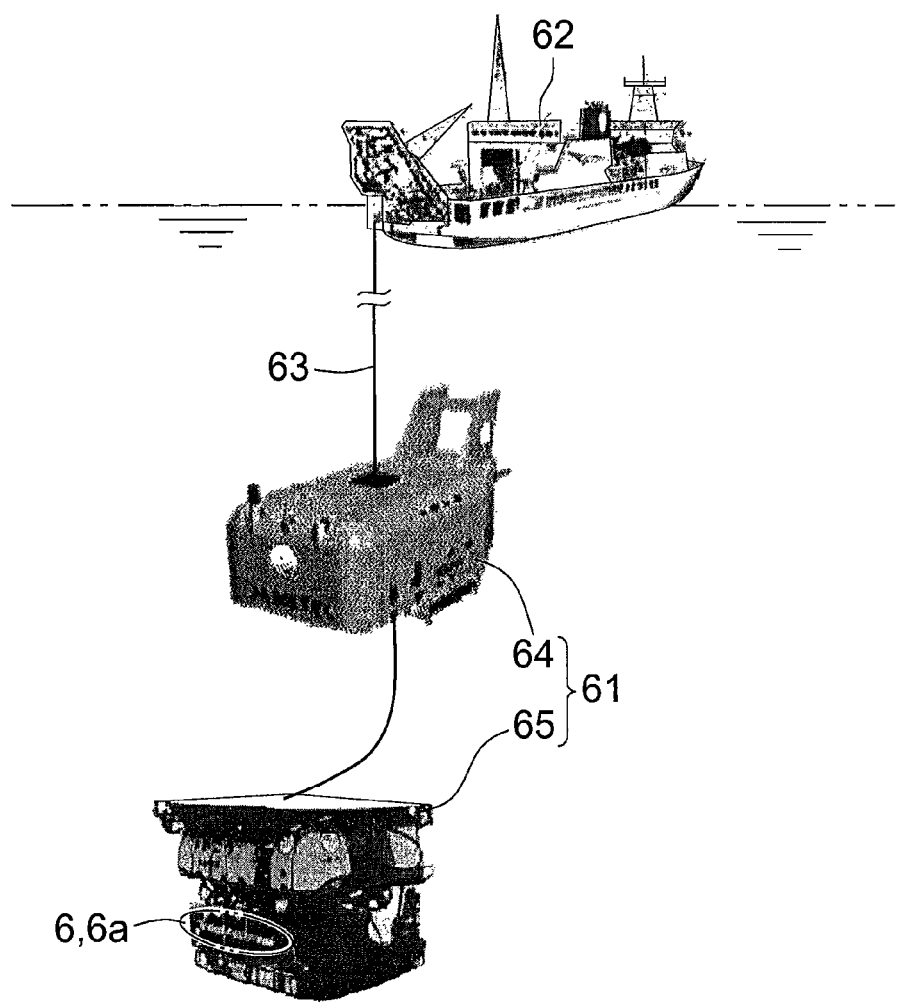

FIG. 12 is a view showing an uncrewed exploratory unit 61 equipped with the pressure-resistant container 6, 6a. The uncrewed exploratory unit 61 includes a thruster 64 which is tied up to a primary cable 63 hanging down in a tensioned state from a ship 62 at sea, and an exploratory unit main body 65 which is accommodated in the thruster 64. The pressure-resistant container 6 or 6a disposed at a side of the exploratory unit main body 65 serves not only as a pressure-resistant container capable of withstanding water pressure at depths ranging from 1000 m to 11000 m which is in a hadal zone, but also as a buoyant element.

Figure 13:
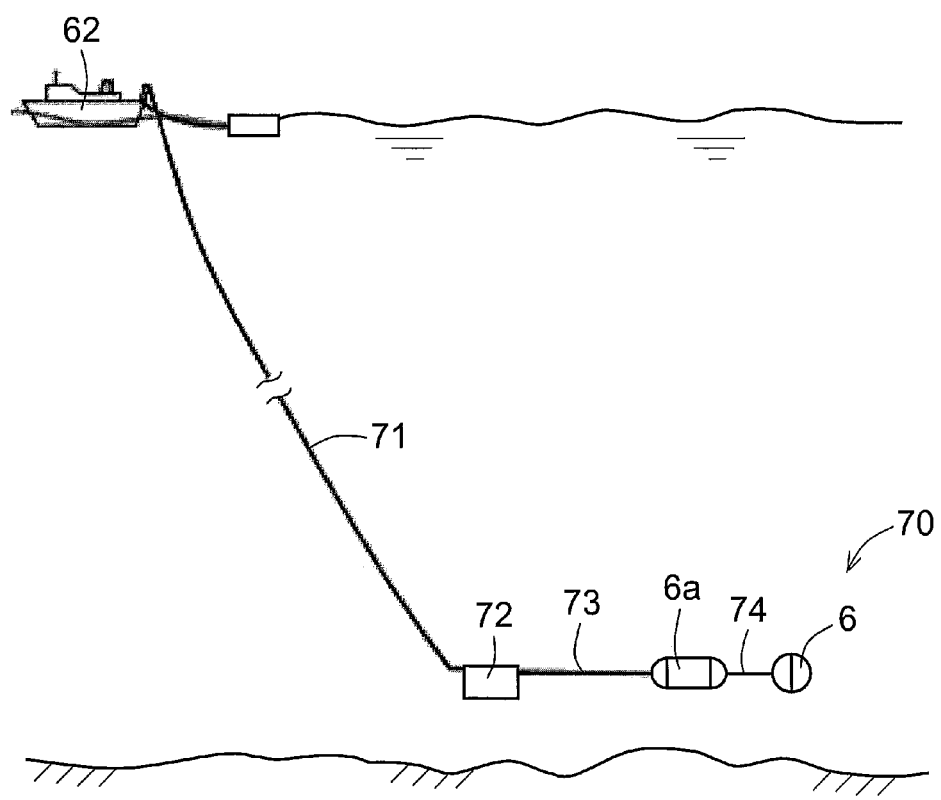

FIG. 13 is a view showing a towed deep-sea exploratory apparatus 70 equipped with the pressure-resistant containers 6 and 6a. The towed deep-sea exploratory apparatus 70 is exploratory equipment provided with the shell 1 of the pressure-resistant containers 6 and 6a. A weight 72 is attached to a main wire 71 having a length in a range of 1000 m to 10000 m hanging down in a tensioned state from the ship 62 at sea. In the interest of magnetic noise reduction, the weight 72 is tied to a nylon-made, ca. 100 m-long rope 73, and the pressure-resistant containers 6 and 6a accommodating e.g., a proton magnetometer are connected to this rope 73. The apparatus is towed under the sea about 500 m above the seafloor. The pressure-resistant container 6a is connected, through a ca. 30 m-long cable 74, to the pressure-resistant container 6 accommodating a magnetometer sensor for measurement of geomagnetic force.

As has already been described, as compared with a pressure-resistant container made of metal, the pressure-resistant container 6, 6a made of ceramics can be far lighter in weight. Moreover, the ceramic pressure-resistant container 6, 6a is highly advantageous from an economic perspective and exhibits high endurance against corrosion. Further, by virtue of its non-magnetic and insulating nature, the pressure-resistant container 6, 6a is applicable to a variety of observation instruments. This breakthrough pressure-resistant container 6, 6a will find a wide range of applications, including a deep-water crewed submergence research vehicle, an uncrewed exploratory unit, a seabed-mounted observation instrument, and Argo float. Argo float is observation equipment intended for the real-time monitoring of global ocean fluctuations, which is capable of automatic float-and-sink movements in the range between the sea surface and a depth of 2000 m for measurement of water temperature, salt content, and so forth.

The use of the ceramic pressure-resistant container 6, 6a allows weight reduction for an uncrewed exploratory unit and observation equipment, a decrease in the required amount of buoyant materials, which leads to a drop in the price of an uncrewed exploratory unit and so forth, and facilitation of operation of an uncrewed exploratory unit, with a consequent widening of the range of applications.

By applying the shell 1 of the pressure-resistant container 6, 6a to a self-floating ocean-bottom seismometer, it is possible to implement a pressure-resistant ball adapted to a water depth of 11000 m. Although the maximum permissible water depth for the case of using a glass-made pressure-resistant ball has heretofore been about 6000 m, in the application to observation equipment such as Argo float having neutral buoyancy, the limit of the maximum permissible water depth can be raised.

In crewed submergence research vehicles and uncrewed exploratory units, the reduction of the weight of the pressure-resistant container 6, 6a leads to a decrease in the required amount of buoyant materials, and eventually to reduction in size and weight in the entire system. This affords the advantages of ease of handling on a ship, a decrease in thrust required for movements, and price reduction. Moreover, in the application to a self-floating observation instrument, the range of permissible water depth can be widened.

REFERENCE SIGNS LIST

1: Shell
6, 6a: Pressure-resistant container
11: Shell portion
12: Thick-walled portion
13: Connecting portion
16: Through hole
17: Seating face
21: Shell-portion inner surface
22: Shell-portion outer surface
23: Thick-walled-portion inner surface
24: Thick-walled-portion outer surface
25: Connecting-portion inner surface
26: Connecting-portion outer surface
27: Inner surface boundary
28: Outer surface boundary
T: Reference wall thickness
T1: Inner wall thickness
T2: Outer wall thickness

The invention claimed is:
1. A shell of a pressure-resistant container, comprising:
a shell portion which has a curved shape and is made only of ceramics and has a convexly-curved surface; and
a thick-walled portion which has a curved shape and is made only of ceramics, continues into the shell portion, is larger in thickness than the shell portion, and has a through hole penetrating through the thick-walled portion in a thickness direction thereof, the thick-walled portion being defined in part by an imaginary spherical surface,
wherein the shell portion includes a shell-portion inner surface defined by part of an imaginary spherical surface having a first radius of predetermined length, and a shell-portion outer surface defined by part of an imaginary spherical surface having a second radius which is longer than the first radius, and
the thick-walled portion includes a thick-walled-portion inner surface defined by part of an imaginary spherical surface having a third radius which is shorter than the first radius, and a thick-walled-portion outer surface defined by part of an imaginary spherical surface having a fourth radius which is longer than the second radius, and an angle, which is formed between straight lines connecting a center point of a half sphere with points of the thick-walled portion where a thickness of the thick-walled portion begins to decrease toward the shell portion, that is in a range of 20° to 30°.

2. The shell of a pressure-resistant container according to claim 1, wherein the following formulae are satisfied:

$$t2 = 3.8 \times t1 - 3.9 \, (t1 \geq 1.16) \quad (1), \text{ and}$$

$$1.66 \leq t1 + t2 \leq 4.8 \quad (2),$$

wherein T represents a thickness of the shell portion; T1 represents a radial distance between an imaginary spherical surface having a fifth radius which is equal to an average of the first radius and the second radius, and the thick-walled-portion inner surface; T2 represents a radial distance between the imaginary spherical surface having the fifth radius and the thick-walled-portion outer surface; t1 represents a ratio of T1 to T; and t2 represents a ratio of T2 to T.

3. The shell of a pressure-resistant container according to claim 1, wherein the shell portion and the thick-walled portion are made of silicon nitride sintered compact having a relative density of 98% or more.

4. The shell of a pressure-resistant container according to claim 1, wherein the shell portion and the thick-walled portion are made of alumina sintered compact having a hardness of 15 GPa or more.

5. A pressure-resistant container, comprising:
the shell of a pressure-resistant container according to claim 1.

6. An exploratory apparatus, comprising:
the pressure-resistant container according to claim 5.

\* \* \* \* \*